United States Patent
Shemesh et al.

(10) Patent No.: US 12,219,048 B1
(45) Date of Patent: *Feb. 4, 2025

(54) TECHNIQUES FOR ENCRYPTED DISK CYBERSECURITY INSPECTION UTILIZING DISK CLONING

(71) Applicant: Wiz, Inc., New York, NY (US)

(72) Inventors: Daniel Hershko Shemesh, Givat-Shmuel (IL); Yarin Miran, Rishon Lezion (IL); Roy Reznik, Tel Aviv (IL); Ami Luttwak, Binyamina (IL); Yinon Costica, Tel Aviv (IL); Yaniv Shaked, Tel Aviv (IL); Eyal Moscovici, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,091

(22) Filed: Oct. 4, 2023

Related U.S. Application Data

(63) Continuation-in-part of application No. 18/146,074, filed on Dec. 23, 2022, and a continuation-in-part of
(Continued)

(51) Int. Cl.
*H04L 9/08* (2006.01)
*H04L 9/40* (2022.01)

(52) U.S. Cl.
CPC .......... *H04L 9/0822* (2013.01); *H04L 9/0861* (2013.01); *H04L 9/0891* (2013.01); *H04L 63/1416* (2013.01)

(58) Field of Classification Search
CPC ... H04L 9/0822; H04L 9/0861; H04L 9/0891; H04L 63/1416
See application file for complete search history.

(56) References Cited

U.S. PATENT DOCUMENTS

| 6,910,132 B1 | 6/2005 | Bhattacharya |
| 7,627,652 B1 | 12/2009 | Commons et al. |
| (Continued) | | |

FOREIGN PATENT DOCUMENTS

| EP | 4160983 A1 | 4/2023 |
| EP | 4254869 A2 | 10/2023 |
| RU | 2421792 C2 | 6/2011 |

OTHER PUBLICATIONS

International Search Report, PCT/IB23/55312. ISA/US, Commissioner for Patents, Alexandria, Virginia. Dated Aug. 30, 2023.
(Continued)

*Primary Examiner* — Oleg Korsak
(74) *Attorney, Agent, or Firm* — M&B IP Analysts, LLC

(57) ABSTRACT

A system and method for inspecting encrypted disks for a cybersecurity object using a generic key is disclosed. The method includes: detecting an encrypted disk in a cloud computing environment, the cloud computing environment including a security policy service; authorizing a key policy on the security policy service for a default key of an inspector account, wherein the key policy is a policy authorized to decrypt the encrypted disk; generating a second encrypted disk based on the encrypted disk; inspecting the second encrypted disk for a cybersecurity object with the default key; and releasing a resource allocated to the second encrypted disk in response to completing the inspection.

19 Claims, 7 Drawing Sheets

Related U.S. Application Data application No. 18/146,076, filed on Dec. 23, 2022, and a continuation-in-part of application No. 17/664,508, filed on May 23, 2022.

(60) Provisional application No. 63/266,031, filed on Dec. 27, 2021.

(56) References Cited

U.S. PATENT DOCUMENTS

| | | | |
|---|---|---|---|
| 7,784,101 | B2 | 8/2010 | Verbowski et al. |
| 8,200,965 | B2 | 6/2012 | Fujibayashi et al. |
| 8,352,431 | B1 | 1/2013 | Protopopov et al. |
| 8,412,688 | B1 | 4/2013 | Armangau et al. |
| 8,413,239 | B2 | 4/2013 | Sutton |
| 8,417,967 | B2 | 4/2013 | Foster et al. |
| 8,499,354 | B1 | 7/2013 | Satish et al. |
| 8,595,822 | B2 | 11/2013 | Schrecker et al. |
| 8,701,200 | B2 | 4/2014 | Naldurg et al. |
| 8,789,049 | B2 * | 7/2014 | Hutchins ............ G06F 9/45558 718/1 |
| 8,898,481 | B1 | 11/2014 | Osburn, III et al. |
| 8,914,406 | B1 | 12/2014 | Haugsnes |
| 9,009,836 | B1 | 4/2015 | Yarykin et al. |
| 9,094,379 | B1 | 7/2015 | Miller |
| 9,119,017 | B2 | 8/2015 | Sinha |
| 9,165,142 | B1 | 10/2015 | Sanders et al. |
| 9,172,621 | B1 | 10/2015 | Dippenaar |
| 9,330,273 | B2 | 5/2016 | Khetawat et al. |
| 9,369,433 | B1 | 6/2016 | Paul |
| 9,419,996 | B2 | 8/2016 | Porat |
| 9,438,634 | B1 | 9/2016 | Ross et al. |
| 9,467,473 | B2 | 10/2016 | Jayaraman |
| 9,544,327 | B1 | 1/2017 | Sharma et al. |
| 9,563,385 | B1 | 2/2017 | Kowalski et al. |
| 9,569,328 | B2 | 2/2017 | Pavlov et al. |
| 9,582,662 | B1 | 2/2017 | Messick et al. |
| 9,596,235 | B2 | 3/2017 | Badam et al. |
| 9,607,104 | B1 | 3/2017 | Turner et al. |
| 9,646,172 | B1 | 5/2017 | Hahn |
| 9,661,009 | B1 | 5/2017 | Karandikar et al. |
| 9,672,355 | B2 | 6/2017 | Titonis et al. |
| 9,712,503 | B1 | 7/2017 | Ahmed |
| 9,892,261 | B2 | 2/2018 | Joram et al. |
| 10,002,247 | B2 | 6/2018 | Suarez et al. |
| 10,032,032 | B2 | 7/2018 | Suarez et al. |
| 10,063,445 | B1 | 8/2018 | Preece |
| 10,135,826 | B2 | 11/2018 | Reddy |
| 10,229,125 | B2 | 3/2019 | Goodman et al. |
| 10,255,370 | B2 | 4/2019 | Carpenter et al. |
| 10,360,025 | B2 | 7/2019 | Foskett et al. |
| 10,412,103 | B2 | 9/2019 | Haugsnes |
| 10,412,109 | B2 | 9/2019 | Loureiro et al. |
| 10,459,664 | B1 | 10/2019 | Dreier et al. |
| 10,503,904 | B1 | 12/2019 | Singh et al. |
| 10,536,471 | B1 | 1/2020 | Derbeko et al. |
| 10,540,499 | B2 | 1/2020 | Wailly et al. |
| 10,552,610 | B1 | 2/2020 | Vashisht et al. |
| 10,554,507 | B1 | 2/2020 | Siddiqui et al. |
| 10,567,468 | B2 | 2/2020 | Perlmutter |
| 10,572,226 | B2 | 2/2020 | Biskup et al. |
| 10,574,675 | B2 | 2/2020 | Peppe et al. |
| 10,623,386 | B1 | 4/2020 | Bernat et al. |
| 10,630,642 | B2 | 4/2020 | Clark et al. |
| 10,664,619 | B1 | 5/2020 | Marelas |
| 10,691,636 | B2 | 6/2020 | Tabaaloute et al. |
| 10,721,260 | B1 | 7/2020 | Schlarp et al. |
| 10,725,775 | B2 | 7/2020 | Suarez et al. |
| 10,735,430 | B1 | 8/2020 | Stoler |
| 10,735,442 | B1 | 8/2020 | Swackhamer |
| 10,791,138 | B1 | 9/2020 | Siddiqui et al. |
| 10,803,188 | B1 | 10/2020 | Rajput et al. |
| 10,831,898 | B1 | 11/2020 | Wagner |
| 10,915,626 | B2 | 2/2021 | Tang |
| 10,924,503 | B1 | 2/2021 | Pereira et al. |
| 10,972,484 | B1 | 4/2021 | Swackhamer |
| 10,997,293 | B2 | 5/2021 | Wiest et al. |
| 11,005,860 | B1 | 5/2021 | Glyer et al. |
| 11,016,954 | B1 | 5/2021 | Babocichin et al. |
| 11,044,118 | B1 | 6/2021 | Reed et al. |
| 11,055,414 | B2 | 7/2021 | Claes |
| 11,064,032 | B1 | 7/2021 | Yang et al. |
| 11,099,976 | B2 | 8/2021 | Khakare et al. |
| 11,102,231 | B2 | 8/2021 | Kraning et al. |
| 11,165,652 | B1 | 11/2021 | Byrne |
| 11,216,563 | B1 * | 1/2022 | Veselov ............. H04L 63/1408 |
| 11,245,730 | B2 | 2/2022 | Bailey |
| 11,271,961 | B1 | 3/2022 | Berger |
| 11,334,670 | B2 | 5/2022 | Franco et al. |
| 11,366,897 | B1 | 6/2022 | Ramanathan et al. |
| 11,388,183 | B2 | 7/2022 | Hoopes et al. |
| 11,405,426 | B2 | 8/2022 | Nguyen |
| 11,444,974 | B1 | 9/2022 | Shakhzadyan |
| 11,483,317 | B1 | 10/2022 | Bolignano et al. |
| 11,496,498 | B2 | 11/2022 | Wright et al. |
| 11,496,519 | B1 | 11/2022 | Gupta et al. |
| 11,503,063 | B2 | 11/2022 | Rao |
| 11,507,672 | B1 | 11/2022 | Pagnozzi et al. |
| 11,516,222 | B1 | 11/2022 | Srinivasan et al. |
| 11,520,907 | B1 | 12/2022 | Borowiec et al. |
| 11,546,360 | B2 | 1/2023 | Woodford et al. |
| 11,556,659 | B1 | 1/2023 | Kumar et al. |
| 11,558,401 | B1 | 1/2023 | Vashisht et al. |
| 11,558,423 | B2 | 1/2023 | Gordon et al. |
| 11,567,751 | B2 | 1/2023 | Cosentino et al. |
| 11,570,090 | B2 | 1/2023 | Shen et al. |
| 11,575,696 | B1 | 2/2023 | Ithal et al. |
| 11,614,956 | B2 | 3/2023 | Tsirkin et al. |
| 11,645,390 | B2 | 5/2023 | Vijayvargiya et al. |
| 11,662,928 | B1 | 5/2023 | Kumar et al. |
| 11,663,340 | B2 | 5/2023 | Wu et al. |
| 11,669,386 | B1 | 6/2023 | Abrol |
| 11,700,233 | B2 | 7/2023 | St. Pierre |
| 11,750,566 | B1 | 9/2023 | Montilla Lugo |
| 11,757,844 | B2 | 9/2023 | Xiao |
| 11,770,398 | B1 | 9/2023 | Erlingsson |
| 11,792,284 | B1 | 10/2023 | Nanduri |
| 11,799,874 | B1 | 10/2023 | Lichtenstein et al. |
| 11,803,766 | B1 | 10/2023 | Srinivasan |
| 11,841,945 | B1 | 12/2023 | Fogel et al. |
| 11,914,707 | B1 | 2/2024 | Ramanathan et al. |
| 11,922,220 | B2 | 3/2024 | Haghighat et al. |
| 11,936,785 | B1 * | 3/2024 | Shemesh ................ H04L 9/088 |
| 12,019,770 | B2 | 6/2024 | Nilsson et al. |
| 12,050,696 | B2 | 7/2024 | Pieno et al. |
| 12,058,177 | B2 | 8/2024 | Crabtree et al. |
| 2003/0188194 | A1 | 10/2003 | Currie et al. |
| 2003/0217039 | A1 | 11/2003 | Kurtz et al. |
| 2005/0050365 | A1 | 3/2005 | Seki et al. |
| 2005/0251863 | A1 | 11/2005 | Sima |
| 2005/0283645 | A1 | 12/2005 | Turner et al. |
| 2007/0174915 | A1 | 7/2007 | Gribble et al. |
| 2007/0271360 | A1 | 11/2007 | Sahita et al. |
| 2008/0075283 | A1 | 3/2008 | Takahashi |
| 2008/0221833 | A1 | 9/2008 | Brown et al. |
| 2008/0307020 | A1 | 12/2008 | Ko et al. |
| 2008/0320594 | A1 | 12/2008 | Jiang |
| 2009/0106256 | A1 | 4/2009 | Safari et al. |
| 2009/0271863 | A1 | 10/2009 | Govindavajhala et al. |
| 2010/0242082 | A1 | 9/2010 | Keene et al. |
| 2010/0281275 | A1 | 11/2010 | Lee et al. |
| 2011/0055361 | A1 | 3/2011 | Dehaan |
| 2011/0276806 | A1 | 11/2011 | Casper et al. |
| 2012/0110651 | A1 | 5/2012 | Van Biljon et al. |
| 2012/0297206 | A1 | 11/2012 | Nord et al. |
| 2013/0024940 | A1 * | 1/2013 | Hutchins ............ G06F 9/45558 726/24 |
| 2013/0054890 | A1 | 2/2013 | Desai et al. |
| 2013/0124669 | A1 | 5/2013 | Anderson et al. |
| 2013/0160119 | A1 | 6/2013 | Sartin |
| 2013/0160129 | A1 | 6/2013 | Sartin |
| 2013/0290708 | A1 * | 10/2013 | Diaz ..................... H04L 63/08 713/165 |
| 2014/0096134 | A1 | 4/2014 | Barak |

(56) References Cited

U.S. PATENT DOCUMENTS

| | | |
|---|---|---|
| 2014/0115578 A1 | 4/2014 | Cooper et al. |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti |
| 2015/0254364 A1 | 9/2015 | Piduri et al. |
| 2015/0304302 A1 | 10/2015 | Zhang et al. |
| 2015/0310215 A1 | 10/2015 | McBride et al. |
| 2015/0319160 A1 | 11/2015 | Ferguson et al. |
| 2016/0063466 A1 | 3/2016 | Sheridan et al. |
| 2016/0078231 A1 | 3/2016 | Bach et al. |
| 2016/0103669 A1 | 4/2016 | Gamage et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0299708 A1 | 10/2016 | Yang et al. |
| 2016/0366185 A1 | 12/2016 | Lee et al. |
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0034198 A1 | 12/2017 | Powers et al. |
| 2017/0374136 A1 | 12/2017 | Ringdahl |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0150412 A1 | 5/2018 | Manasse |
| 2018/0159882 A1 | 6/2018 | Brill |
| 2018/0181310 A1 | 6/2018 | Feinberg et al. |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0276084 A1* | 9/2018 | Mitkar ............... G06F 11/3006 |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0359058 A1 | 12/2018 | Kurian |
| 2018/0359059 A1 | 12/2018 | Kurian |
| 2019/0007271 A1 | 1/2019 | Rickards et al. |
| 2019/0058722 A1 | 2/2019 | Levin et al. |
| 2019/0068617 A1 | 2/2019 | Coleman |
| 2019/0068627 A1 | 2/2019 | Thampy |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012659 A1* | 1/2020 | Dageville ............. G06F 16/245 |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1 | 7/2020 | Shua |
| 2020/0244692 A1 | 7/2020 | Shua |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0026932 A1 | 1/2021 | Boudreau et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1 | 6/2021 | Ross et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0234889 A1 | 7/2021 | Burle et al. |
| 2021/0263802 A1* | 8/2021 | Gottemukkula ........ H04L 67/10 |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1* | 10/2021 | Shua .................. H04L 63/1441 |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0409486 A1 | 12/2021 | Martinez |
| 2022/0012771 A1 | 1/2022 | Gustafson |
| 2022/0030020 A1 | 1/2022 | Huffman |
| 2022/0053011 A1 | 2/2022 | Rao et al. |
| 2022/0086173 A1 | 3/2022 | Yavo et al. |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |

(56) References Cited

U.S. PATENT DOCUMENTS

| | | |
|---|---|---|
| 2022/0374519 A1 | 11/2022 | Botelho et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0093527 A1* | 3/2023 | Shua ............... G06F 9/45558 726/23 |
| 2023/0095756 A1 | 3/2023 | Wilkinson et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0164148 A1 | 5/2023 | Narayan |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208870 A1 | 6/2023 | Yellapragada et al. |
| 2023/0224319 A1 | 7/2023 | Isoyama et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1* | 11/2023 | Shemesh ............... G06F 21/53 |
| 2024/0007492 A1 | 1/2024 | Shen et al. |
| 2024/0037229 A1 | 2/2024 | Pab?n et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |
| 2024/0241752 A1 | 7/2024 | Crabtree et al. |

OTHER PUBLICATIONS

Microsoft Build. "Introduction to Azure managed disks". Aug. 21, 2023, https://docs.microsoft.com/en-us/azure/virtual-machines/managed-disks-overview.

Written Opinion of the International Searching Authority, PCT/IB23/55312. ISA/US Commissioner for Patents, Alexandria, Virginia. Dated Aug. 30, 2023.

Ali Gholami; Security and Privacy of Sensitive Data in Cloud Computing: A Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

No stated author; Downdetector; 2020; retrieved from the Internet https://web.archive.org/web/20201226001244/https://downdetector.com/; pp. 1-8, as printed. (Year: 2020).

No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).

No stated author; IsItoownRightNow; 2020; retrieved from the Internet https://web.archive.org/web/20201202121557/ https:// www.isitdownrightnow.com/; pp. 1-2 as printed. (Year: 2020).

Sahil Suneja; Safe Inspection of Live Virtual Machines; IEEE; Year:2017; pp. 97-111.

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).

Siqi Ma; Certified Copy? Understanding Security Risks of Wi-Fi Hotspot based Android Data Clone Services; ACM; Year: 2021; pp. 320-331.

Zhang et al. BMC Bioinformatics 2014. "On finding bicliques in bipartite graphs: a novel algorithm and its application to the integration of diverse biological data types". http://www.biomedcentral.com/1471-2105/15/110.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.IEEE.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.IEEE.org/stamp/stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.IEEE.org/stamp/stamp.jsp? tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.IEEE.org/stamp/stamp.jsp?tp=&arnumber=9250645 (Year: 2020).

* cited by examiner

TECHNIQUES FOR ENCRYPTED DISK CYBERSECURITY INSPECTION UTILIZING DISK CLONING

CROSS-REFERENCE TO RELATED APPLICATIONS

This application is a continuation in part of U.S. Non-Provisional patent application Ser. No. 17/664,508 filed on May 23, 2022, U.S. Non-Provisional patent application Ser. No. 18/146,074, filed Dec. 23, 2022, and U.S. Non-Provisional patent application Ser. No. 18/146,076, filed Dec. 23, 2022. The Ser. Nos. 18/146,074 and 18/146,076 claim priority from U.S. Provisional Patent Application No. 63/266,031 filed on Dec. 27, 2021, all contents of which are hereby incorporated by reference.

TECHNICAL FIELD

The present disclosure relates generally to cybersecurity, and specifically to inspection of encrypted disks in an agentless manner for cybersecurity objects.

BACKGROUND

Cybersecurity threats are ever present in cloud computing environments, and often leave traces, indicators, and the like, on a disk, storage space, memory, etc., of the workload with which they are associated. For example, a cybersecurity threat can be a misconfiguration, a vulnerability, an exposure, a weak secret, an exposed password, an out of date software application, and the like.

Scanning for cybersecurity threats in a cloud computing environment often includes scanning storage, disks, and the like, for such cybersecurity objects. One method of protecting information includes encrypting storage resources, such as disks, so that even if they are accessed by an unauthorized party, the disk is not readable. However, such encrypted disks also cannot be scanned as a scanner requires an unencrypted volume to access. Encrypted disks present a challenge as decryption keys may not be readily available, and therefore their contents cannot be scanned.

Encryption of disks can be performed at application level, on a cloud platform level, or both. A scanner therefore cannot readily access the information on the disk, or determine what is present on it.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a first encrypted disk on a workload in a cloud computing environment, the first encrypted disk having an address in a cloud storage system; generating a key for an inspector account; generating a second encrypted disk with a reencrypt command utilizing the generated key for the inspector account; inspecting the second encrypted disk for a cybersecurity threat; and releasing a resource allocated to the second encrypted disk in response to completing the inspection. Other embodiments of this aspect include corresponding computer systems, apparatus, and computer programs recorded on one or more computer storage devices, each configured to perform the actions of the methods.

Implementations may include one or more of the following features. Method may include: generating an instruction to clone the first encrypted disk into the second encrypted disk using a reencrypt command with the generated key, the instruction when executed causes generation of a cloned disk descriptor, the cloned disk descriptor having a data field including the address of the first encrypted disk. Method may include: generating a pointer for the cloned disk descriptor of the second encrypted disk to an encryption key, the encryption key used for encrypting the first encrypted disk. Method where the cloned disk descriptor includes a pointer to an address of a storage block in a managed storage of the cloud computing environment. Method may include: determining that the first encrypted disk utilizes an application based encryption; and fetching a custom key for the application based encryption from a key vault management system. Method may include: decrypting the custom key, where the custom key is encrypted using a key-encryption-key. Method may include: determining that the first encrypted disk is encrypted based on metadata associated with the first encrypted disk. Implementations of the described techniques may include hardware, a method or process, or a computer tangible medium.

In one general aspect, non-transitory computer-readable medium may include one or more instructions that, when executed by one or more processors of a device, cause the device to: detect a first encrypted disk on a workload in a cloud computing environment, the first encrypted disk having an address in a cloud storage system generate a key for an inspector account generate a second encrypted disk with a reencrypt command utilizing the generated key for the inspector account inspect the second encrypted disk for a cybersecurity threat; and release a resource allocated to the second encrypted disk in response to completing the inspection. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a first encrypted disk on a workload in a cloud computing environment, the first encrypted disk having an address in a cloud storage system. System may in addition generate a key for an inspector account. System may moreover generate a second encrypted disk with a reencrypt command utilizing the generated key for the inspector account. System may also inspect the second encrypted disk for a cybersecurity threat. System may furthermore release a resource allocated to the second encrypted disk in response to completing the inspection. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: generate an instruction to clone the first encrypted disk into the second encrypted disk using a reencrypt command with the generated key, the instruction when executed causes generation of a cloned disk descriptor, the cloned disk descriptor having a data field including the address of the first encrypted disk. System where the memory contains further instructions which when executed by the processing circuitry further configure the system to: generate a pointer for the cloned disk descriptor of the second encrypted disk to an encryption key, the encryption key used for encrypting the first encrypted disk. System where the cloned disk descriptor includes a pointer to an address of a storage block in a managed storage of the cloud computing environment.

System where the memory contains further instructions which when executed by the processing circuitry further configure the system to: determine that the first encrypted disk utilizes an application based encryption; and fetch a custom key for the application based encryption from a key vault management system. System where the memory contains further instructions which when executed by the processing circuitry further configure the system to: decrypt the custom key, where the custom key is encrypted using a key-encryption-key. System where the memory contains further instructions which when executed by the processing circuitry further configure the system to: determine that the first encrypted disk is encrypted based on metadata associated with the first encrypted disk. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
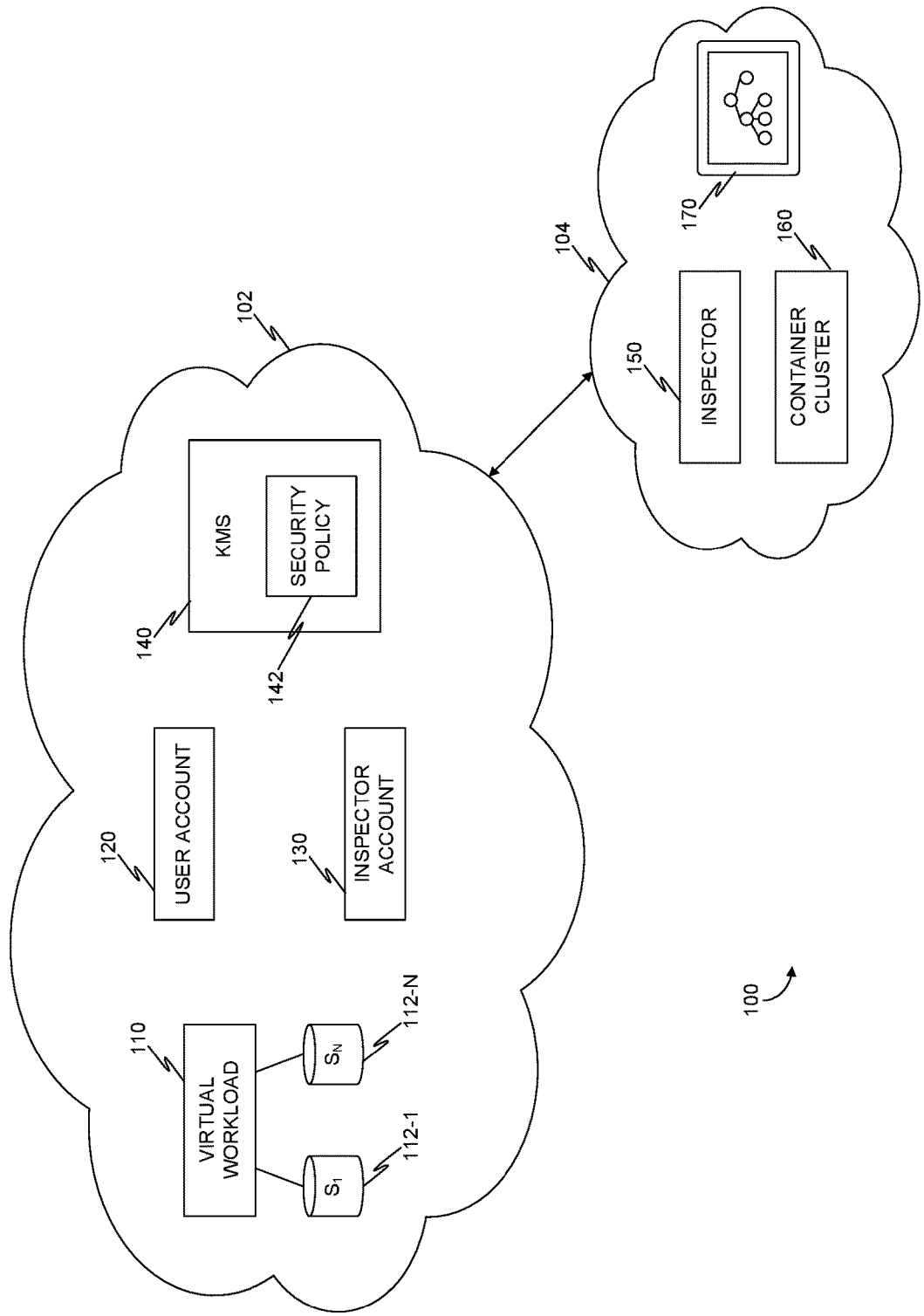
FIG. 1 is an example schematic illustration of a network diagram of a production cloud environment and an inspecting cloud environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a network diagram 100 of a production cloud environment and an inspecting cloud environment, utilized to describe an embodiment. In an embodiment, a production cloud environment 102 includes a plurality of principals, such as user account 120, and a plurality of virtual resources, such as virtual workload 110. In some embodiments, a cloud environment is implemented utilizing a cloud computing infrastructure, such as Amazon® Web Services (AWS), Microsoft® Azure, or Google® Cloud Platform (GCP). Storage may be implemented, for example using S3 in AWS.

In an embodiment, a virtual resource is a cloud entity which provides a service, access to a service, provisioning of hardware, and the like, such as a virtual machine, a software container, a serverless function, and the like. In certain embodiments, a principal is a cloud entity which is authorized to act on a resource. For example, according to an embodiment, a principal is a user account, a service account, a role, a combination thereof, and the like.

In some embodiments, the virtual workload 110 is connected a storage disk, a plurality of storage disks, and the like, such as storage disks 112-1 through 112-N, where 'N' is an integer having a value of '2' or greater. In some embodiments, the storage disk is provisioned as a virtual disk, as a block address on a block storage, and the like. For example, a block storage is a Simple Storage Service (S3®), according to an embodiment.

In an embodiment, a user account 120 includes unique identifiers, such as email address, username, password, combinations thereof, and the like. A user account is managed by an identity and access management (IAM) service in a cloud environment, according to an embodiment. The IAM service further controls (i.e., defines authorizations, policies, rules, and the like, for) user groups, user roles, permissions, service accounts, and the like, in some embodiments.

In some embodiments an inspector account 130 is deployed in the production environment 102, and is implemented, for example as a user account, a service account, and the like. The inspector account is authorized to communicate with various components of the cloud environment 102 and further communicate with an inspecting cloud environment 104, according to some embodiments.

In certain embodiments, the inspector account 130 is configured to communicate with a key management service (KMS) 140. The KMS 140 is implemented as a virtual workload, a plurality of virtual workloads, and the like, in the production cloud environment 102, according to an embodiment. In some embodiments the KMS 140 is deployed on the cloud computing infrastructure on which the production environment 102 is deployed.

A KMS 140 is configured to store therein keys which are used to access encrypted resources in the production cloud environment 102, such as encrypted disks, encrypted files, and the like, according to an embodiment. The KMS 140 further includes a security policy engine 142, which is configured to associate a security policy with at least a portion of the keys stored in the KMS 140, according to an embodiment. In certain embodiments, a security policy indicates what user accounts are authorized to use a key managed by the KMS 140.

In an embodiment, the inspecting cloud environment 104 is configured to receive information from the production cloud environment 102 and is further configured to detect cybersecurity risks in the production cloud environment 102. In some embodiments, the inspecting cloud environment 104 includes a plurality of inspectors, such as inspector 150, which are each configured to detect a cybersecurity object. A cybersecurity object is, according to an embodiment, a secret, an application, a key, a certificate, a malware signature or object, a password, a combination thereof, and the like.

In certain embodiments, the inspector 150 is implemented as a virtual workload, such as a serverless function, deployed in the inspecting cloud environment 104. An inspector 150 is configured to receive information originating from the cloud production environment 102, in some embodiments, and is further configured to inspect the information to discover predefined data objects (i.e., cybersecurity objects) therein.

In an embodiment, the inspecting cloud environment 104 further includes a software container cluster, such as software container cluster 160. The software container cluster 160 is implemented for example utilizing a Kubernetes® (stylized as K8s) application, according to an embodiment. In certain embodiments, each cluster 160 includes a plurality of nodes.

For example, in an embodiment, an inspectable disk is generated based on the disk 112-1 in order to inspect the contents of the disk 112-1. In an embodiment, the inspectable disk is generated based on a snapshot, a clone, a copy, a combination thereof, and the like, of the disk 112-1. In certain embodiments, access to the inspectable disk is provided to the inspector 150 via the inspector account 130. For example, the inspector 150 is configured, in an embodiment, to utilize a service account (e.g., the inspector account 130) to access the inspectable disk and perform operations thereon, such as a read operation to access the contents of the inspectable disk.

In an embodiment, the software container cluster 160 is configured to provision a storage resource attached to a container, for example as a volume which is generated based on the inspectable disk. In certain embodiments, an inspector 150 is configured to access to the volume, and inspect the volume for a cybersecurity object. In an embodiment a plurality of inspectors are configured to each access the volume generated from the inspectable disk. Inspecting the inspectable disk in place of the disk 112-1 in the production environment allows the production environment to continue its operation with minimal interference, while inspecting the contents of the disk 112-1 without disrupting operation in the production environment.

Figure 2:
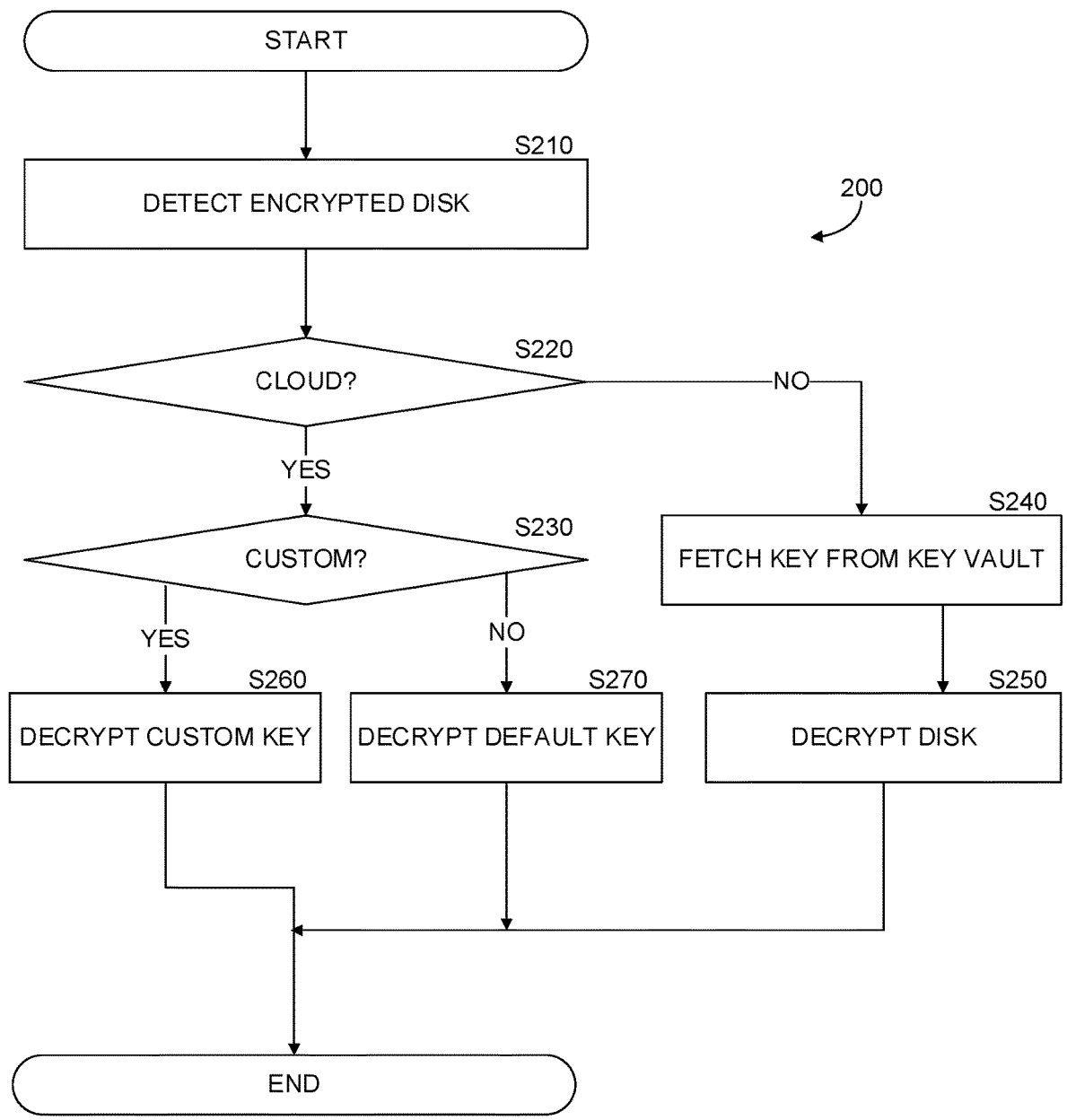
FIG. 2 is an example flowchart of a method for inspecting encrypted disks of workloads in a cloud environment, implemented according to an embodiment.

FIG. 2 is an example flowchart 200 of a method for inspecting encrypted disks of workloads in a cloud environment, implemented according to an embodiment. In some embodiments, generating an inspectable disk based on a snapshot, copy, clone, combination thereof, and the like, of an encrypted disk will result in an inspectable disk which is not readable without a corresponding key.

It is beneficial for the inspecting cloud environment to be able to inspect such encrypted disks. In an embodiment, encryption of the disk is provided at the cloud level, application level, a combination thereof, and the like.

While some embodiments illustrate user of cloud managed encryption in AWS, and application level encryption in Azure, it should be readily apparent that the teachings herein can be applied to other cloud infrastructures with appropriate adjustments.

At S210, an encrypted disk is selected for inspection. In an embodiment, the encrypted disk is associated with a virtual workload, for example by provisioning a storage resource to the virtual workload. In an embodiment, a virtual workload is, for example, a virtual machine, a serverless function, a software container, and the like. In an embodiment, an inspection account (i.e., a service account) is utilized in determining that a disk is encrypted in a production cloud environment.

For example, in an embodiment a service account is authorized to access a disk, access metadata of a storage disk, access a storage provisioning system, and the like, to determine if a disk is an encrypted disk. In an embodiment, an encrypted disk includes metadata which indicates that the disk is an encrypted disk.

At S220, a check is performed to determine a level of encryption. In an embodiment, a disk is encrypted at application level, encrypted at cloud level, a combination thereof, and the like. In an embodiment, cloud level encryption (also referred to as cloud managed encryption) includes utilizing a key of a Key Management System (KMS) to encrypt a disk. In an embodiment, if the disk is encrypted at the application level execution continues at S230.

In some embodiments, if the disk is encrypted using cloud managed encryption execution continues at S240. In an embodiment, a disk may be encrypted utilizing one or more methods of cloud managed encryption and application level encryption. The methods for accessing such disks may be used consecutively, until a fully decrypted disk is accessible.

At S230, a check is performed to determine a key type. In an embodiment, a key type is a default key, a custom key, and the like. For example, a KMS in AWS supports two types of keys. The first type is an Elastic Block Store (EBS) default key, and the second type is a custom key. A policy associated with the default key cannot be changed, while for a custom key the policy can be configured, and reconfigured. In an embodiment, if the key is a custom key, execution continues at S260. In an embodiment, if the key is a default key, execution continues at S270.

At S240, a key is fetched from the key vault. For example, in an embodiment, Azure Key Vault is utilized as a KMS, implemented in Azure® cloud environments. At an application level encryption, a disk may be encrypted using Bitlocker (for Windows® operating systems), Cryptoluks (for Linux operating systems), and like, in some embodiments. An inspector account is authorized to fetch keys from a key vault, according to an embodiment. In certain embodiments, a key is a KEK (key encryption key), meaning that the key is encrypted using another asymmetric encryption, and this needs to be decrypted as well.

At S250, the disk is decrypted. In an embodiment the disk is decrypted using the key fetched from the key vault. In some embodiments, an inspectable disk is generated from the decrypted disk, and access thereto is provided to an inspecting cloud environment, where the inspectable disk is inspected for cybersecurity objects. In an embodiment, a disk is encrypted at application level utilizing based on the operating system, for example Microsoft® Windows, or Linux.

Linux disks utilize Cryptoluks, which, in an embodiment, contains two partitions, a first partition which is encrypted and a second partition which is plaintext. The plaintext partition is mounted in the inspecting cloud environment, according to an embodiment. In some embodiments, the plaintext partition includes a file named 'osluksheader' which appears in the 'luks' directory. In an embodiment, an inspector is configured to execute a decrypt command, for example:
sudo cryptsetup open/dev/<encrypted-device> <name>- -header=/<mountpoint>/luks/osluksheader
When prompted for a password, the passphrase (i.e., key) is provided after decoding the base64 through the pipe connected to the stdin. The result is a readable disk which is mountable using the device mapper, for example:
mount/dev/mapper/<name> <mount point>
In an embodiment the disk is mounted, for example on a volume which is provisioned in an inspection cluster. In certain embodiments, an inspector is configured to search the disk for data objects (e.g., cybersecurity objects) which are utilized to assess security risks and map the disk, its contents, the corresponding workload, a combination thereof, and the like, to a security graph.

In an embodiment utilizing the Microsoft Windows operating system, Windows encrypts disks using Bitlocker, a proprietary Microsoft OS encryption feature. Decrypting a Bitlocker encrypted disk includes, in an embodiment, setting the decoded base64 key from the keyvaults on the disk <secret-file.dat>. Decryption includes, according to an embodiment, executing the following command:
do dislocker/dev/<encrypted-device> -f <secret-file.bek> - -/media/<unencrypted-device>
In an embodiment, initiating execution of the command is performed by the inspector account. A decrypted disk is mounted, according to an embodiment, by initiating execution of the following instruction:
mount/media/<unencrypted-device>/dislocker-file/<mountpoint>
In an embodiment, the instruction is executed by a control plane of a software container cluster in an inspection environment. A mounted disk, for example on a volume which is provisioned in an inspection software container cluster, is inspected for cybersecurity objects. In some embodiments, the disk, its contents, any detected cybersecurity object, and a corresponding workload, are represented on a security graph.

At S260, the disk is decrypted using the custom key. In some embodiments, decryption utilizing a custom key is described in more detail with respect to FIG. 3.

At S270, the disk is decrypted using the default key. Decryption utilizing a default key is described in more detail with respect to FIG. 4.

Figure 3:
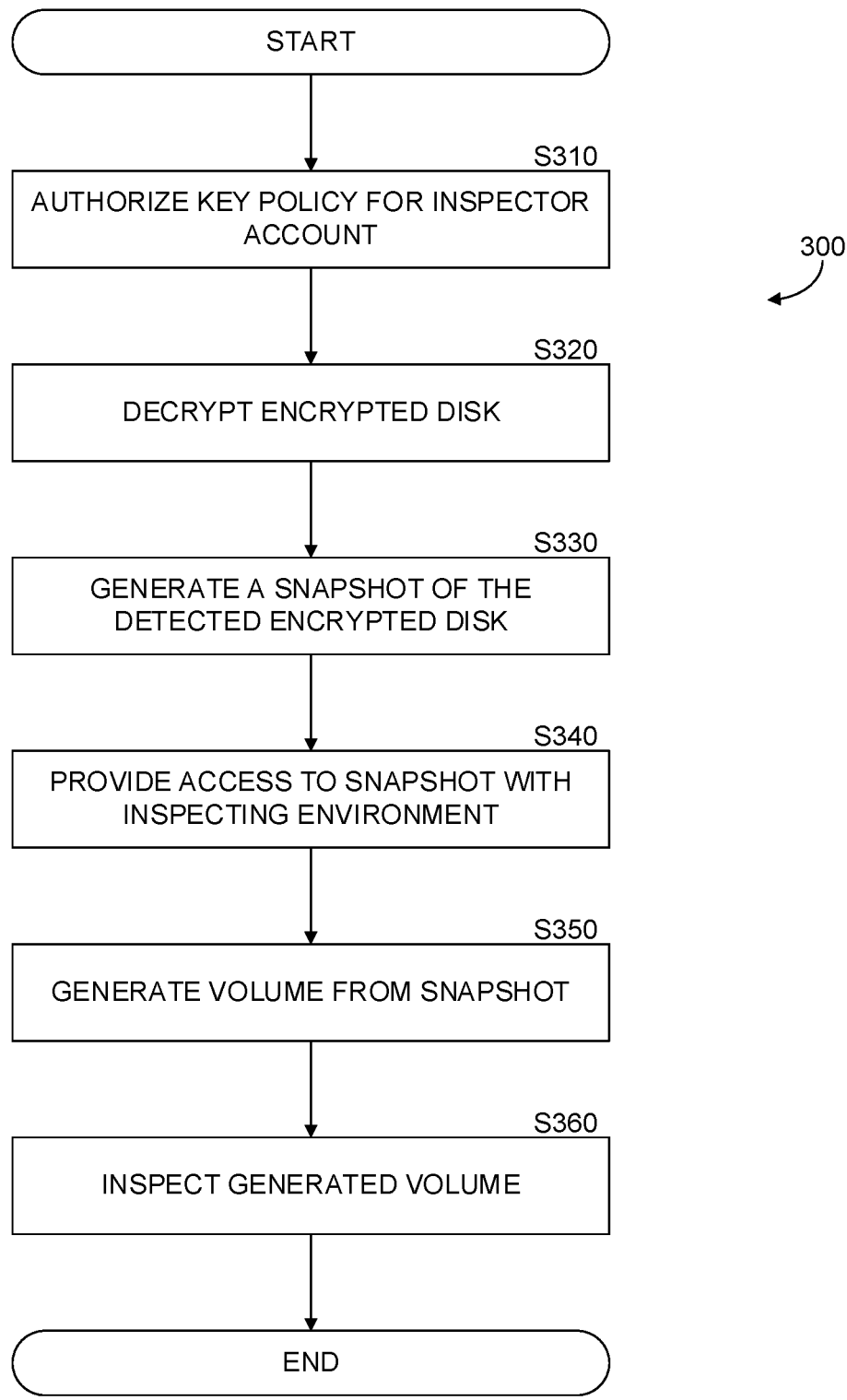
FIG. 3 is an example of a flowchart of a method for disk decryption utilizing a custom key for inspecting a disk for a cybersecurity object, implemented in accordance with an embodiment.

FIG. 3 is an example of a flowchart 300 of a method for disk decryption utilizing a custom key for inspecting a disk for a cybersecurity object, implemented in accordance with an embodiment.

At S310, a key policy is attached to a custom key. The custom key is used for decrypting an encrypted disk in a cloud computing environment. In an embodiment, AWS KMS is used in an AWS cloud environment. A kms:PutKeyPolicy instruction is set to provide cross-account permissions, allowing an inspector account access to the required decryption keys, according to an embodiment.

In certain embodiments, the KMS is configured to provide certain instructions (such as DecribeKey, CreateGrant, GenerateDataKey, ReEncrypt, Decrypt, etc.) only to keys in the KMS which have a tag corresponding to permissions granted to the inspector account.

At S320, the encrypted disk is decrypted. In an embodiment, the decrypted disk is utilized in generating an inspectable disk. In some embodiments, the encrypted disk is decrypted by executing an instruction initiated by an inspector account utilizing the decryption key accessed from the KMS, access to which was previously provided to the inspector account.

At S330, an inspectable disk is generated based on the decrypted disk. In certain embodiments, generating an inspectable disk includes generating a clone, a copy, a snapshot, and the like, based on the decrypted disk. In an embodiment the instruction for generating the inspectable disk is initiated by the inspector account.

At S340, access to the inspectable disk is provided to an inspector. In an embodiment, providing access to an inspector includes providing access to the inspectable disk to a service account (e.g., inspector account) which is configured to be assumed by an inspector workload.

In an embodiment, providing access includes sending a copy, a pointer of a clone, a snapshot, and the like, from the inspector account to the inspecting environment over a secure communication channel, such as a secure shell (SSH) communication.

At S350, a volume is generated from the inspectable disk. In an embodiment, a software container cluster is configured to provision a storage, into which a volume is generated based on the inspectable disk.

At S360, an instruction is generated to inspect the volume. In an embodiment, the volume is inspected for cybersecurity objects. In some embodiments, inspection includes searching the volume for files, text, regular expressions (regex), secrets, keys, application identifiers, malware signatures, virtual workloads, misconfigurations, combinations thereof, and the like.

Figure 4:
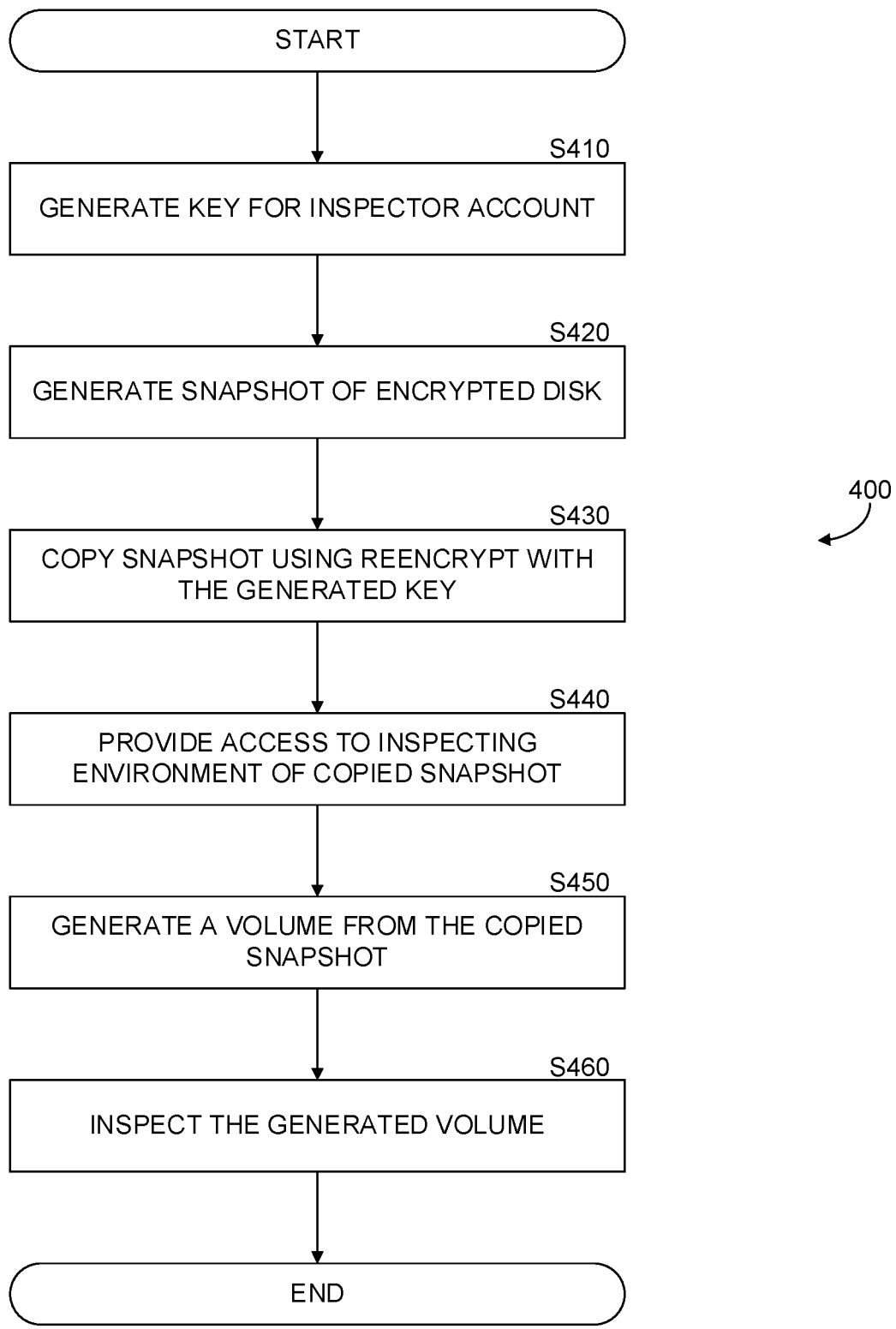
FIG. 4 is an example flowchart of a method for disk decryption utilizing a default key for detecting cybersecurity objects, implemented in accordance with an embodiment.

FIG. 4 is an example flowchart 400 of a method for disk decryption utilizing a default key for detecting cybersecurity objects, implemented in accordance with an embodiment. In certain cloud infrastructures, such as AWS, default keys do not support changing of an attached security policy.

At S410, a key is generated for an inspector account. In an embodiment, the key is generated to allow cross account access, with permissions for the inspector account. For example, an encrypted disk is selected, and a key is generated for the inspector account, to allow the inspector account to access the encrypted disk, according to an embodiment. In some embodiments, the inspector account is a service account which is configured to be assumed by an inspector workload.

At S420, a snapshot is generated of the encrypted disk. In an embodiment, generating the snapshot is performed based on executing an instruction initiated by an inspector account. In certain embodiments, the snapshot is a block-based copy of the encrypted disk at a particular point in time.

At S430, the snapshot is copied with a reencrypt command. Copying a snapshot includes, in an embodiment, executing a CopySnapshot instruction with a ReEncrypt instruction, where reencryption is performed with the generated key. In an embodiment, the instructions are provided by the inspector account, which has kms:CreateGrant and kms:ReEncryptFrom permissions from the KMS.

At S440, access is provided to the copied snapshot. In an embodiment, access is provided to an inspecting cloud environment, such as the inspecting cloud environment 104 of FIG. 1 above, and specifically to an inspector, for example by providing authorization to an inspector account to access the copied snapshot. In an embodiment, the copied snapshot is decrypted using the generated key for the inspector account. The key is provided to the inspector account. according to some embodiments.

At S450, a volume is generated from the copied snapshot. In an embodiment, a software container cluster is configured to provision a storage space, into which a volume is generated based on the copied snapshot of the decrypted disk.

At S460, the generated volume is inspected for a cybersecurity object. In an embodiment, inspection includes searching the volume for a file, a text, a regular expression (regex), a secret, a key, a certificate, a virtual workload, a combination thereof, and the like.

Figure 5:
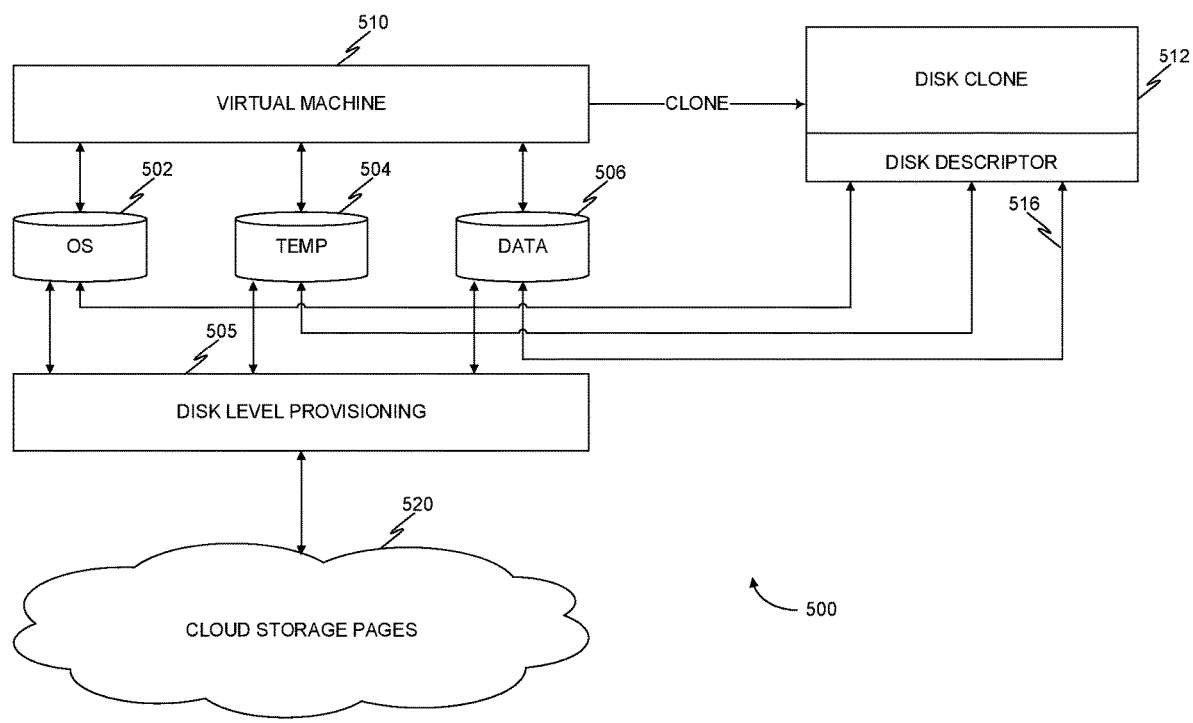
FIG. 5 is an example diagram of a virtual machine and a cloned disk thereof, utilized to describe an embodiment.

FIG. 5 is an example diagram 500 of a virtual machine 510 and a cloned disk thereof, utilized to describe an embodiment. While an Azure® cloud computing infrastructure is discussed here, it should be understood that the teachings herein apply equally to other cloud computing infrastructures which offer equal functionality. The VM 510 includes a plurality of disks allocated to the VM 510. The VM 510 may be deployed only with an OS disk, with an OS disk and a plurality of data disks, and so on.

In this example embodiment, the plurality of disks includes an operating system (OS) disk 502, an optional temporary disk 504, and at least a data disk 506. The OS disk 502 includes a preinstalled OS, such as Microsoft® Windows, or Linux®. The preinstalled OS is in a boot volume of the OS disk 502. The optional temporary disk 504 may be used for storing temporary data, such as page files, swap files, and the like. The data disk 506 may be used for storing an application, application code, libraries, binaries, application data, and the like. In an embodiment, a plurality of data disks 506 may be allocated to the VM 510. In some configurations, a disk of the plurality of disks may be encrypted. For example, the OS disk 502, and the data disk 506 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 510 by a disk level provisioning 505. In an embodiment, the disk level provisioning 505 is an application deployed in a cloud computing infrastructure. The disk level provisioning 505 provisions hardware resource to the VM 510 which results in allocation of a disk. The hardware resources are provisioned from cloud storage pages 520 of the cloud computing infrastructure. The hardware resources may be solid state device (SSD) storage, hard disk drive (HDD) storage, optical storage, other magnetic storage, and the like. In an example embodiment, the cloud storage pages 520 are Azure page blobs. A page blob is a collection of pages, each page having a predetermined size. For example, the predetermined size may be 512-bytes per page.

A disk clone 512 (also referred to as cloned disk 512) includes a disk descriptor which includes a reference to an address of a disk of the VM 510. In certain cloud computing infrastructures, when a disk is cloned, a pointer, such as pointer 516, is used to point to an original disk, in this example the data disk 206. In an embodiment, this may be achieved by dereferencing a pointer of the VM 510 which points to the data disk 506, and generating the pointer 516 for the cloned VM 510 to point to the data disk 206. In certain embodiments where a disk is encrypted, a pointer may be generated for the cloned disk 512 to the encryption key.

In an embodiment, the cloning process generates the disk clone 512 as a background process. This is possible through the utilization of diffs. A diff is an additional content that includes the difference between a particular content at one point in time (e.g., when the original disk was cloned) and at a second, later, point in time. Thus, the VM 510 may access the data disk 506 and any diffs generated, or committed, after the disk clone 512 is generated, whereas the disk clone 512 may access only the content of the original data disk 506, and cannot access any diffs generated since.

The cloned disk 512 may then be inspected by an inspector, such as the inspector 150 of the inspection environment 104 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller is configured to determine if inspecting a virtual instance requires generating a disk clone or a snapshot. In an embodiment, the determination is performed based on the geographic location of the VM 510, an intended geographic location into which a disk of the VM 510 is cloned, a geographic location of the inspection environment, a number of disks allocated to the virtual instance, or any combination thereof.

By inspecting a cloned disk 512 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 512 is complete, the cloned disk 512 may be spun down, releasing any resources allocated to it, and removing the pointers pointing to the disks of the virtual machine. In an embodiment, the cloned disk 512 may be deleted to accomplish spinning down.

Figure 6:
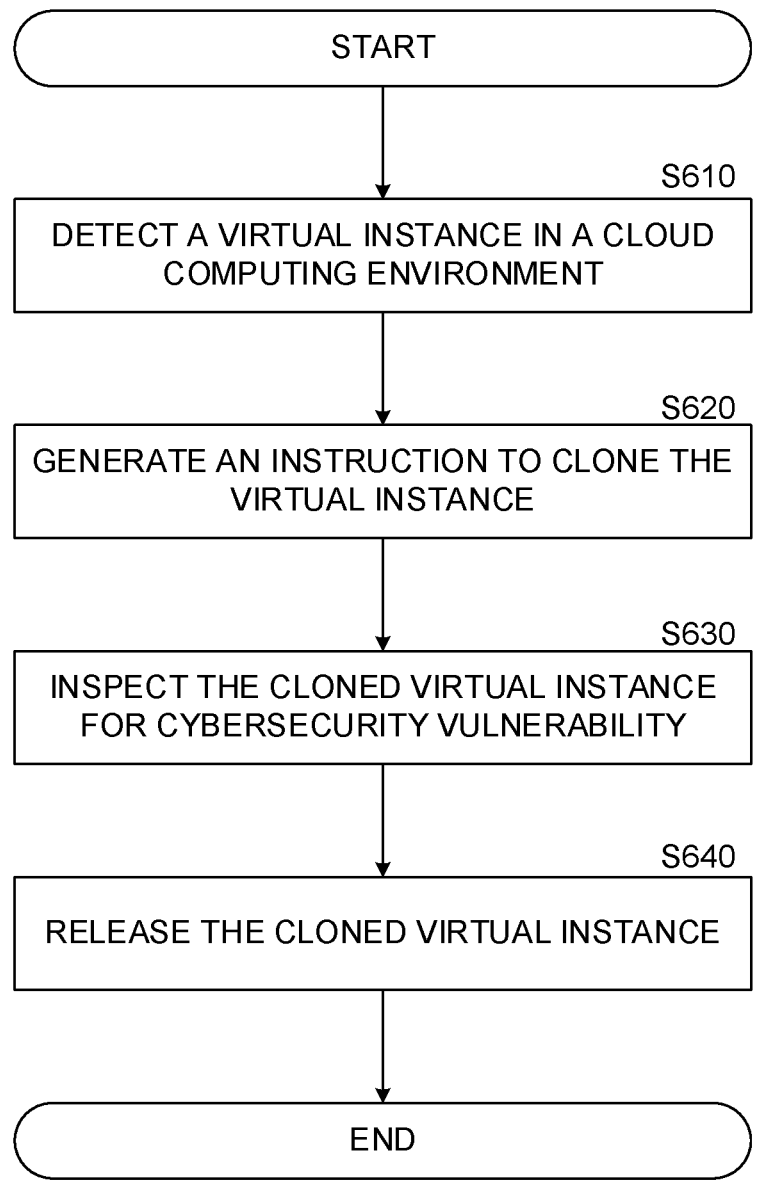
FIG. 6 is an example flowchart of a method for generating a disk clone of a virtual instance for vulnerability inspection according to an embodiment.

FIG. 6 is an example flowchart of a method for generating a disk clone of a virtual instance for vulnerability inspection according to an embodiment.

At S610, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as an "original disk"). In some embodiments, the disk is represented as a node in the security graph, the node being connected to an another node, the another node representing the virtual instance.

In certain embodiments, detecting a live virtual instance includes receiving an identifier of the live virtual instance, and an instruction to inspect the live virtual instance.

At S620, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in the same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold, a cloning process may be initiated, otherwise a snapshot is generated, and inspection is performed on the generated snapshot.

At S630, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which, when executed, configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S640, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 7:
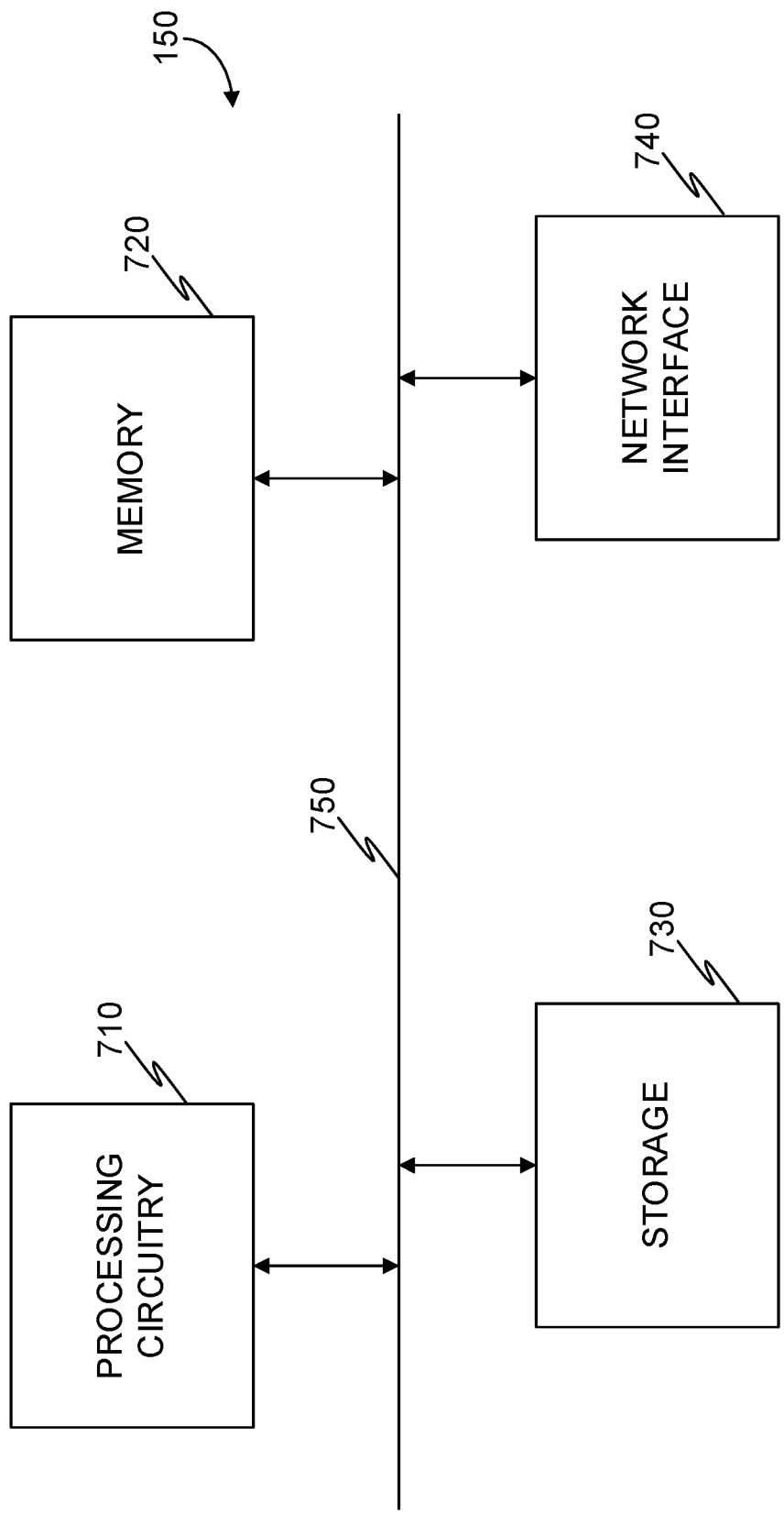
FIG. 7 is an example schematic diagram of an inspector according to an embodiment.

FIG. 7 is an example schematic diagram of an inspector 150 according to an embodiment. The inspector 150 includes a processing circuitry 710 coupled to a memory 720, a storage 730, and a network interface 740. In an embodiment, the components of the inspector 150 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the inspector 150 with communication with, for example, the KMS 140, the container cluster 160, the security database 170, and the like.

It should be understood that the embodiments described herein are not limited to the specific architecture illustrated in FIG. 7, and other architectures may be equally used without departing from the scope of the disclosed embodiments.

Furthermore, in certain embodiments other systems described herein may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting encrypted disks using a default key for detecting a cybersecurity object, comprising:
   detecting a first encrypted disk on a workload in a cloud computing environment, the first encrypted disk having an address in a cloud storage system;
   generating a key for an inspector account that is distinct from any information of any account of any of one or more users that have access to the first encrypted disk;
   generating a second encrypted disk with a reencrypt command utilizing the generated key for the inspector account such that the second encrypted disk is a clone of the first encrypted disk, the second encrypted disk including a cloned disk descriptor having a data field including an address of the first encrypted disk, and wherein the second encrypted disk becomes available for inspection substantially immediately upon creation and is not accessible at any time by any of the one or more users that have access to the first encrypted disk;
   inspecting the second encrypted disk for a cybersecurity threat, wherein the first encrypted disk remains accessible to the one or more users that have access to the first encrypted disk while the inspecting is performed; and
   releasing a resource allocated to the second encrypted disk in response to completing the inspection.

2. The method of claim 1, further comprising:
   generating an instruction to clone the first encrypted disk into the second encrypted disk using a reencrypt command with the generated key, the instruction when executed causes generation of the cloned disk descriptor.

3. The method of claim 2, further comprising:
   generating a pointer for the cloned disk descriptor of the second encrypted disk to an encryption key, the encryption key having been used for encrypting the first encrypted disk.

4. The method of claim 3, wherein the cloned disk descriptor includes a pointer to an address of a storage block in a managed storage of the cloud computing environment.

5. The method of claim 1, further comprising:
   determining that the first encrypted disk utilizes an application based encryption; and
   fetching a custom key for the application based encryption from a key vault management system.

6. The method of claim 5, further comprising:
   decrypting the custom key, wherein the custom key is encrypted using a key-encryption-key.

7. The method of claim 1, further comprising:
   determining that the first encrypted disk is encrypted based on metadata associated with the first encrypted disk.

8. A non-transitory computer-readable medium storing a set of instructions for inspecting encrypted disks using a default key for detecting a cybersecurity object, the set of instructions comprising:
   one or more instructions that, when executed by one or more processors of a device, cause the device to:

detect a first encrypted disk on a workload in a cloud computing environment, the first encrypted disk having an address in a cloud storage system;

generate a key for an inspector account that is distinct from any information of any account of any of one or more users that have access to the first encrypted disk;

generate a second encrypted disk with a reencrypt command utilizing the generated key for the inspector account such that the second encrypted disk is a clone of the first encrypted disk, the second encrypted disk including a cloned disk descriptor having a data field including an address of the first encrypted disk, and wherein the second encrypted disk becomes available for inspection substantially immediately upon creation and is not accessible at any time by any of the one or more users that have access to the first encrypted disk;

inspect the second encrypted disk for a cybersecurity threat, wherein the first encrypted disk remains accessible to the one or more users that have access to the first encrypted disk while the inspecting is performed; and release a resource allocated to the second encrypted disk in response to completing the inspection.

9. A system for inspecting encrypted disks using a default key for detecting a cybersecurity object comprising:

a processing circuitry; and a memory, the memory containing instructions that, when executed by the processing circuitry, configure the system to:

detect a first encrypted disk on a workload in a cloud computing environment, the first encrypted disk having an address in a cloud storage system;

generate a key for an inspector account that is distinct from any information of any account of any of one or more users that have access to the first encrypted disk;

generate a second encrypted disk with a reencrypt command utilizing the generated key for the inspector account such that the second encrypted disk is a clone of the first encrypted disk, the second encrypted disk including a cloned disk descriptor having a data field including an address of the first encrypted disk, and wherein the second encrypted disk becomes available for inspection substantially immediately upon creation and is not accessible at any time by any of the one or more users that have access to the first encrypted disk;

inspect the second encrypted disk for a cybersecurity threat, wherein the first encrypted disk remains accessible to the one or more users that have access to the first encrypted disk while the inspecting is performed; and release a resource allocated to the second encrypted disk in response to completing the inspection.

10. The system of claim 9, wherein the memory contains further instructions which when executed by the processing circuitry further configure the system to:

generate an instruction to clone the first encrypted disk into the second encrypted disk using a reencrypt command with the generated key, the instruction when executed causes generation of the cloned disk descriptor.

11. The system of claim 10, wherein the memory contains further instructions which when executed by the processing circuitry further configure the system to:

generate a pointer for the cloned disk descriptor of the second encrypted disk to an encryption key, the encryption key having been used for encrypting the first encrypted disk.

12. The system of claim 11, wherein the cloned disk descriptor includes a pointer to an address of a storage block in a managed storage of the cloud computing environment.

13. The system of claim 9, wherein the memory contains further instructions which when executed by the processing circuitry further configure the system to:

determine that the first encrypted disk utilizes an application based encryption; and fetch a custom key for the application based encryption from a key vault management system.

14. The system of claim 13, wherein the memory contains further instructions which when executed by the processing circuitry further configure the system to:

decrypt the custom key, wherein the custom key is encrypted using a key-encryption-key.

15. The system of claim 9, wherein the memory contains further instructions which when executed by the processing circuitry further configure the system to:

determine that the first encrypted disk is encrypted based on metadata associated with the first encrypted disk.

16. The method of claim 1, further comprising:

providing the inspector account with a create-grant permission; and providing the inspector account with a reencrypt-from permission.

17. The method of claim 16, wherein the second encrypted disk is generated based on the create-grant permission and the reencrypt-from permission.

18. The system of claim 9, wherein the memory contains further instructions which when executed by the processing circuitry further configure the system to:

provide the inspector account with a create-grant permission; and provide the inspector account with a reencrypt-from permission.

19. The system of claim 18, wherein the second encrypted disk is generated based on the create-grant permission and the reencrypt-from permission.

* * * * *